United States Patent

Kameyama et al.

[11] Patent Number: 5,578,536
[45] Date of Patent: Nov. 26, 1996

[54] EVAPORATING MATERIAL FOR PRODUCING OPTICAL THIN FILM

[75] Inventors: Makoto Kameyama, Funabashi; Noboru Sugahara, Sagamihara; Mitsuharu Sawamura, Yokohama; Junji Terada, Hiratsuka; Junichi Sakamoto, Yokohama, all of Japan

[73] Assignee: Canon Kabushiki Kaisha, Tokyo, Japan

[21] Appl. No.: 428,800

[22] Filed: Apr. 24, 1995

Related U.S. Application Data

[63] Continuation of Ser. No. 35,784, Mar. 23, 1993, abandoned.

[30] Foreign Application Priority Data

Mar. 24, 1992 [JP] Japan ................................ 4-066041

[51] Int. Cl.$^6$ ............................. C04B 35/46; C04B 35/48
[52] U.S. Cl. ............................................. 501/103; 501/104
[58] Field of Search ................................. 501/102, 103, 501/134

[56] References Cited

U.S. PATENT DOCUMENTS

| | | | |
|---|---|---|---|
| 3,934,961 | 1/1976 | Itoh et al. | 350/164 |
| 4,609,267 | 9/1986 | Deguchi et al. | 351/161 |
| 4,707,820 | 11/1987 | Sawamura | 369/284 |
| 4,714,308 | 12/1987 | Sawamura et al. | 350/1.7 |
| 4,784,467 | 11/1988 | Akatsuka et al. | 350/166 |

FOREIGN PATENT DOCUMENTS

| | | | |
|---|---|---|---|
| 3100632 | 11/1981 | Germany | G02B 1/10 |
| 50-35211 | 3/1975 | Japan | G02B 1/10 |
| 59-154402 | 3/1984 | Japan | G02B 1/10 |
| 63-5723 | 2/1988 | Japan | G02B 1/10 |

OTHER PUBLICATIONS

Patent Abstracts of Japan, vol. 16, No. 278 (M–1268), Jun. 22, 1992 & JP–A–40 70 330 (Nitto Dendo Corp.), Mar. 5, 1992.

Patent Abstracts of Japan, vol. 10, No. 56 (C–331), Mar. 6, 1986 & JP–A–60 197 867 (Shinnihon Kinzoku Kagaku), Oct. 7, 1985.

*Primary Examiner*—Karl Group
*Attorney, Agent, or Firm*—Fitzpatrick, Cella, Harper & Scinto

[57] ABSTRACT

An evaporation material is employed to form an optical thin film which is adapted to be formed on an optical element such as a lens or the like. The evaporation material is provided such that zirconium oxide ($ZrO_2$) is mixed with a titanium oxide ($TiO_A$) having a molar ratio A(O/Ti) of oxygen to titanium in a range of 1.0 to 1.75 so that the mixture assumes a molar ratio (Ti/Zr) of titanium to zirconium in a range of 1.0 to 4.0. The mixture is sintered or fused and solidified.

7 Claims, 6 Drawing Sheets

BEFORE FILM FORMATION

FIG. 7B

AFTER FILM FORMATION

EVAPORATING MATERIAL FOR PRODUCING OPTICAL THIN FILM

This application is a continuation of application Ser. No. 08/035,784 filed Mar. 23, 1993, now abandoned.

BACKGROUND OF THE INVENTION

1. Field of the Invention

The present invention relates to an evaporation material for forming an optical thin film, and a method for producing an optical thin film utilizing said material, adapted for forming an optical thin film of a high refractive index or a multi-layered film including the optical thin film, on a plastic lens or a disk composed of a resin material or on an optical element composed of a glass substrate and a resin layer.

2. Related Background Art

For producing an optical thin film, there have conventionally been known methods of vacuum evaporation on a glass or plastic member, utilizing an evaporation material obtained by sintering of a mixture of aluminum oxide ($Al_2O_3$) and zirconium oxide ($ZrO_2$) as disclosed in the U.S. Pat. No. 3,934,961, or obtained by sintering a mixture of zirconium oxide ($ZrO_2$) and titanium oxide ($TiO_2$) as disclosed in the Japanese Patent Laid-Open Application No. 50-35211, or obtained by sintering a mixture of tantalum oxide ($Ta_2O_5$) and zirconium oxide as disclosed in the Japanese Patent Publication No. 63-5723.

However, the optical thin film obtained by evaporation at a substrate temperature within a range from room temperature (ca. 20° C.) to about 120° C., utilizing the $Al_2O_3$-$ZrO_2$ sintered mixture or the $ZrO_2$-$TiO_2$ sintered mixture mentioned above does not show a sufficiently high refractive index, but only shows a refractive index in a range of 1.7 to 1.9, comparable to that of a $ZrO_2$ film. On the other hand, a high refractive index can be attained by forming such optical thin film on a substrate heated to 300° C. or higher. However, in case the substrate is a plastic optical element composed of polymethyl methacrylate (PMMA) resin, polycarbonate (PC) resin, polystyrene (PS) resin, hard polyvinyl chloride resin or polyethylene resin, or an optical element including a layer of such resin, such heating to 300° C. or higher is undesirable since heating beyond the softening point Tg (80°–120° C.) of such resin will result in deformation.

Also an optical thin film of a high refractive index can be obtained by vacuum evaporation with a substrate having a resin layer within a range from room temperature to 120° C., employing a sintered pellet containing tantalum oxide ($Ta_2O_5$) and zirconium oxide ($ZrO_2$) disclosed in the Japanese Patent Publication No. 63-5723 but the refractive index of such optical thin film is about 1.9 to 2.0 and is not sufficiently high.

Also, a sufficiently high refractive index of 2.0–2.1 can be obtained in an evaporated optical thin film at a substrate temperature from room temperature to 120° C. by employing a single material of tantalum oxide ($Ta_2O_5$) or niobium oxide ($Nb_2O_5$) or titanium oxide ($TiO_2$) and utilizing electron irradiation in vacuum with an electron gun. In such materials, however, the temperature required for obtaining a necessary saturated vapor pressure for providing a sufficient evaporation rate is higher than the melting point of the respective material, so that the entire evaporation material fuses at the evaporating operation and is scattered. Such scattered material becomes deposited as small particles onto evaporated film, thus resulting in a high defect rate in the manufacturing process.

SUMMARY OF THE INVENTION

In consideration of the above-explained drawbacks in the prior art, an object of the present invention is to provide an evaporation material capable of:

(1) providing an optical thin film of a high refractive index 2.0 or higher even on a substrate of which temperature cannot be raised at the evaporating operation, such as a plastic or resinous material; and (2) preventing formation of fine particles deposited on the evaporated optical thin film, caused by the scattering of the evaporation material at the evaporating operation.

Another object of the present invention is to provide an optical thin film of a high refractive index and satisfactory quality, and multi-layered interference film in which the above optical thin film is combined with another optical thin film having different refractive index.

According to the present invention, the evaporation material is obtained by mixing titanium oxide having a molar ratio A(O/Ti) of oxygen (O) to titanium (Ti) within a range of 1.0–1.75 with zirconium oxide ($ZrO_2$) so as to obtain a molar ratio (Ti/Zr) of titanium (Ti) to zirconium (Zr) within a range of 1.0–4.0, and sintering or melting and solidifying the mixture.

DETAILED DESCRIPTION OF THE PREFERRED EMBODIMENTS

The evaporation material of the present invention contains titanium oxide ($TiO_2$) having a molar ratio A(O/Ti) of oxygen (O) to titanium (Ti) within a range of 1.0 to 1.75, and zirconium oxide ($ZrO_2$), and is prepared by mixing both in such a manner that the molar ratio (Ti/Zr) of titanium (Ti) to zirconium (Zr) is within a range of 1.0 to 4.0 and sintering or melting and solidifying the mixture. Such evaporation material can provide an optical thin film containing titanium oxide and zirconium oxide, with a refractive index of 2.0 or higher and without the formation of fine particles resulting from the scattering of these components.

The high refractive index of the optical thin film is derived from a fact that the proportion of titanium oxide is high in comparison with that of zirconium oxide in the film prepared by the evaporation material of the present invention. In the vacuum evaporation, the composition of the film is determined by the vapor pressure of titanium oxide and of zirconium oxide, and the molar ratio B(Ti/Zr) of titanium (Ti) and zirconium (Zr) contained in the evaporation material. The vapor pressure $P_{Ti}$ of titanium oxide, the vapor pressure $P_{Zr}$ of zirconium oxide and the composition ratio K(Ti/Zr) of titanium oxide and zirconium oxide in the obtained optical thin film are correlated by:

$$K \propto B \times P_{Ti}/P_{Zr}.$$

Thus the proportion K of titanium oxide contained in the optical thin film becomes larger, or the refractive index of the obtained optical thin film becomes higher, as the ratio of vapor pressures $P_{Ti}/P_{Zr}$ of titanium oxide and zirconium oxide becomes higher, and the molar ratio B of titanium contained in the evaporation material becomes larger.

The vapor pressure of titanium oxide varies according to the molar ratio A(O/Ti) of oxygen (O) to titanium (Ti). The molar ratio A is variable within a range of 0 to 2, and the vapor pressure $P_{Ti}$ of titanium oxide becomes larger as the molar ratio A becomes smaller.

However a molar ratio A less than 1.0 is undesirable because the optical thin film develops an optical absorption. On the other hand, a sufficiently high vapor pressure cannot be obtained at a molar ratio A exceeding 1.75. For these reasons the molar ratio A is preferably within a range of 1.0 to 1.75.

On the other hand, as the molar ratio B(Ti/Zr) of titanium to zirconium, representing the composition ratio of titanium oxide in the evaporation material, becomes larger, the composition ratio of titanium oxide in the obtained optical thin film grows larger so that the refractive index of the film can be made higher. The refractive index of the optical thin film cannot exceed 2.0 when the molar ratio B is less than 1.0, and the refractive index can exceed 2.0 only if the molar ratio B is equal to or larger than 1.0.

On the other hand, if the molar ratio B exceeds 4.9, the melting point of the evaporation material is lowered. Consequently, the entire evaporation material is fused at the evaporating operation, thus being scattered in the operation and causing deposition of fine particles on the optical thin film. For these reasons the molar ratio B is preferably within a range of 1.0 to 4.0.

According to the present invention, powdered titanium oxide and powdered zirconium oxide, mixed with the above-mentioned molar ratio, are shaped by high-pressure pressing, and are subjected to hot pressing in a vacuum oven of a pressure of ca. $10^{-4}$ Torr or less or in an inert gas atmosphere of a pressure of several Torr to obtain a sintered tablet. After the tablet is mounted on a hearth of a vacuum evaporation apparatus, the interior thereof is evacuated to about $1 \times 10^{-5}$ Torr, and oxygen is introduced with a pressure of $5 \times 10^{-5}$ to $2 \times 10^{-4}$ Torr. Then the substrate is set at a temperature within a range from the room temperature (20° C.) to 120° C., and the tablet, serving as the evaporation material, is heated with an electron gun. In this manner there can be formed an optical thin film of a high refractive index on the substrate, without deposition of fine particles.

The optical thin film is effective, as a preferred application, as an antireflection film for a plastic lens or an optical element including a resin layer. For example, in case of providing such plastic lens or optical element with a resin layer, with an antireflection film including the optical thin films of the present invention as high refractive index layers, there will not result the facial deformation because the film formation can be conducted within a range from the room temperature to 120° C., lower than the softening point Tg of the substrate.

The optical thin film of the present invention, in the ESCA (electrospectroscopy for chemical analyzer) analysis employing a Mg-Kα x-ray source, shows a ratio of the 3d peak of Zr to the 2p peak of Ti (Zr-3d/Ti-2p) of 0.1 or less, indicating an elevated content of $TiO_2$.

A multi-layered interference film such as a multi-layered antireflection film can be obtained by forming the optical thin film with a desired thickness such as $\lambda_0/4$ or $\lambda_0/2$ (wherein $\lambda_0$ is the design wavelength), and combining the film with another optical thin film of a lower refractive index, such as of $SiO_2$.

EXAMPLE 1

Figure 1:
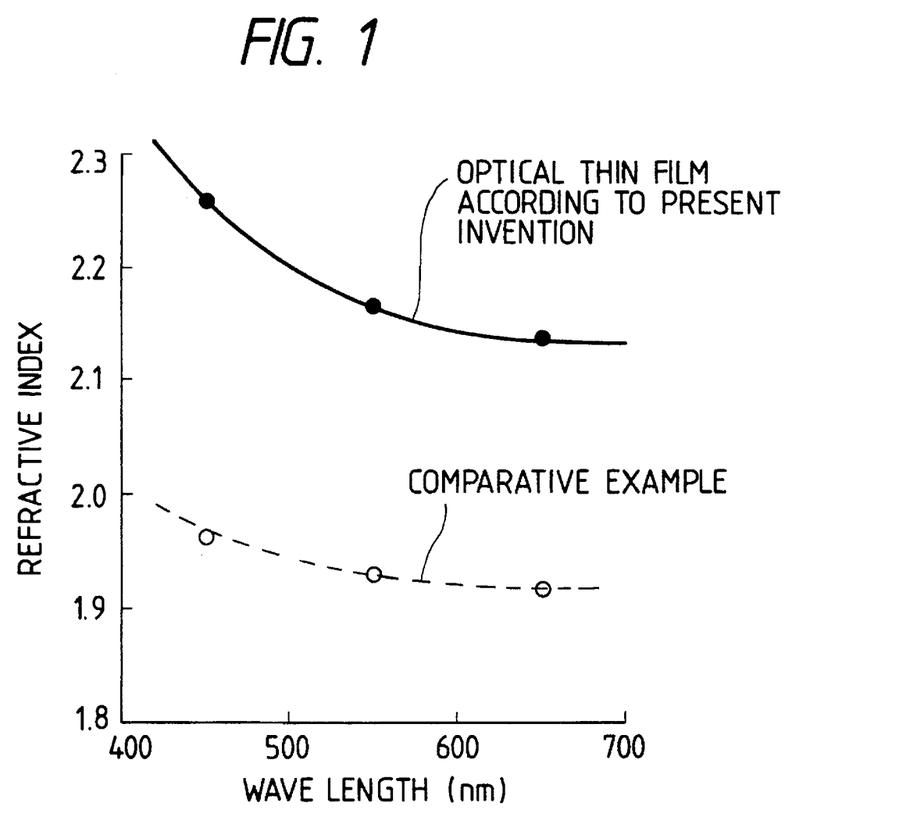
FIG. 1 is a chart showing an example of an optical thin film prepared with the evaporation material of the present invention.

Powdered titanium oxide ($Ti_2O_3$) with a particle size of 1 mm or less and an average particle size of ca. 20 μm, having an oxygen-titanium molar ratio (O/Ti) of 1.5, and powdered zirconium oxide ($ZrO_2$) with a particle size not exceeding 60 μm and an average particle size of ca. 12 μm are mixed with a Ti-Zr molar ratio (Ti/Zr) of 2.5, then press formed and sintered for 3 hours at 1450° C. under vacuum of $10^{-4}$ Torr or less to obtain an evaporation tablet of a diameter of 18 mmφ and a thickness of 12 mm. The tablet was mounted on a hearth for electron beam evaporation in a vacuum evaporation apparatus, of which interior was evacuated to a pressure of $1 \times 10^{-5}$ Torr and oxygen gas was introduced with a pressure of $1 \times 10^{-4}$ Torr. Then the tablet was heated with an electron beam of an acceleration voltage of 8 kV and an emission current of 150 mA, and, on a glass substrate of the room temperature, set in advance in the apparatus, optical thin films of three kinds of thicknesses corresponding to an optical thickness of λ/4 (λ: 450, 550, 650 nm) were deposited with an evaporation rate of ca. 5 Å/sec. FIG. 1 shows the refractive index of these optical thin films, calculated from the peak value of the spectral characteristics (solid line). FIG. 1, showing the refractive index in the ordinate as a function of the wavelength (nm) in the abscissa, also shows, as a comparative example (broken line), the refractive index of an optical thin film prepared with an evaporation material consisting of tantalum oxide ($Ta_2O_5$) and zirconium oxide ($ZrO_2$). In the reference example, powdered tantalum oxide ($Ta_2O_5$) and powdered zirconium oxide ($ZrO_2$) were mixed with a molar Ta/Zr ratio of 1, then press formed and sintered for ca. 3 hours at 1000° C. under vacuum of $10^{-2}$ Torr to obtain an evaporation tablet of a diameter of 18 mmφ and a thickness of 12 mm.

The film formation was conducted in a similar manner as the above-explained example, and the refractive index of thus obtained optical thin film as the comparative example is shown by a broken line in FIG. 1. As will be apparent from FIG. 1, the optical thin film prepared with the evaporation material of the present invention provided a high refractive index exceeding 2.0 in the visible spectral region (400 to 700 nm), without heating of the substrate. On the other hand, the conventional optical thin film of the comparative example could not exceed 2.0 in the refractive index.

Figure 2:
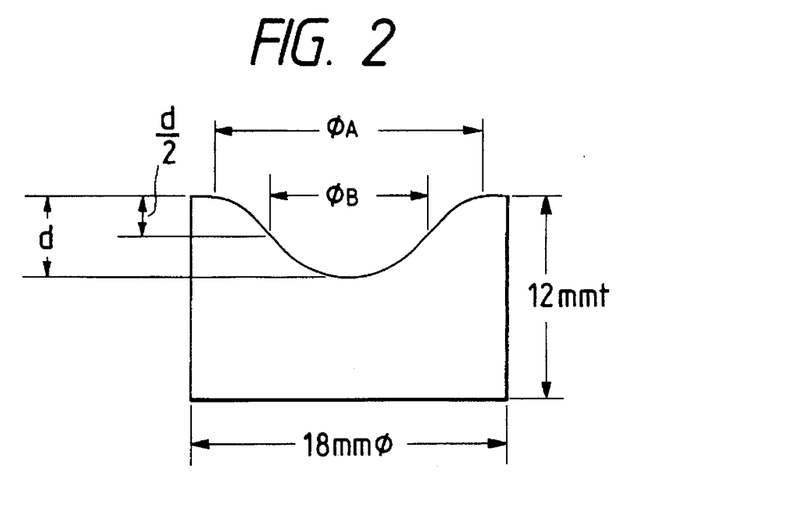
FIG. 2 is a schematic cross-sectional view of an evaporation pellet of the present invention, after the evaporating operation.

FIG. 2 schematically shows the cross-sectional shape of the tablet after the evaporating operation. The tablet of this example showed fusion and evaporation in the vicinity of position of electron beam irradiation, but there is no change in the entire shape. Thus, the scattering of the evaporation material, and the deposition of fine particles onto the optical thin film were not observed. Also the tablet of this example showed little outgassing in the electron beam heating, and could therefore dispense with the degassing step prior to the evaporating operation.

EXAMPLE 2

10 kinds of powdered titanium oxide with oxygen-titanium molar ratios of 0, 0.5, 0.8, 1.0, 1.5, 1.67, 1.75, 1,80, 1.90 and 2.0 were respectively mixed with powdered zirconium oxide ($ZrO_2$) with a Ti-Zr molar ratio of 2.5, then pressed formed and sintered for ca. 3 hours at 1450° C. in vacuum to obtain 10 kinds of evaporation tablets with a diameter of 18 mmφ and a thickness of 12 mm.

Figure 3:
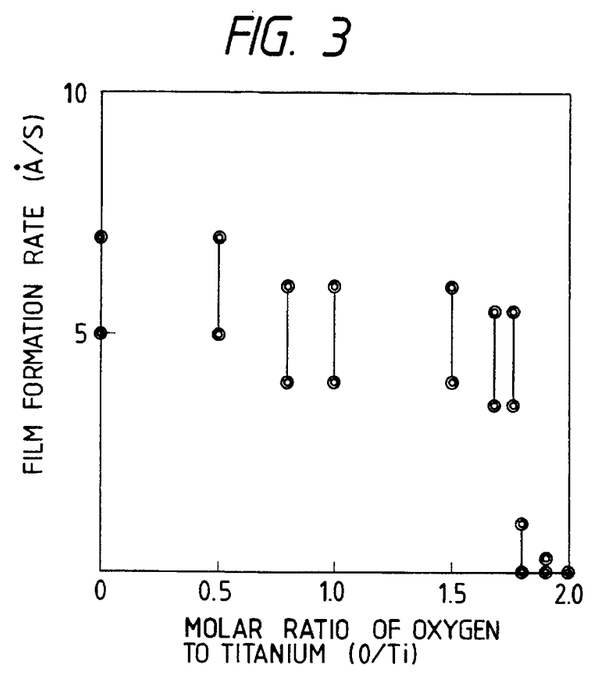
FIG. 3 is a chart showing the film formation speed of the evaporation material of the present invention.

These tablets were subjected to the evaporating operation as in the example 1, and the film forming rate was measured with the crystal oscillator method. The power of the electron beam was selected at a level not causing the fusion of the entire tablet, namely with an acceleration voltage of 8 kV and an optimum value of the emission current within a range of 150 to 200 mA. The obtained results are shown in FIG. 3, which shows the film forming rate (Å/sec) per unit time in the ordinate and the oxygen-titanium molar ratio (O/Ti) in the abscissa. As shown in FIG. 3, there were obtained following relationships between the molar ratios and the film forming rate:

TABLE 1

| Molar ratio (O/Ti) | Film forming rate (Å/sec) |
| --- | --- |
| 0 | 5 to 7 |
| 0.5 | 5 to 7 |
| 0.8 | 4 to 6 |
| 1.0 | 4 to 6 |
| 1.5 | 4 to 6 |
| 1.67 | 3 to 5.5 |
| 1.75 | 3 to 5.5 |
| 1.80 | 0 to 1 |
| 1.90 | 0 to 0.25 |
| 2.0 | 0 |

As will be apparent from these results shown in Table 1, a practical film forming rate of 3 Å/sec could not be obtained for an oxygen-titanium molar ratio of 1.8, 1.9 or 2.0. This is presumably due to the low vapor pressure of titanium oxide of the above-mentioned molar ratio. The variable range of the film forming rate mentioned above is attributable to the fluctuation of the emission current in the course of the evaporating operation.

Figure 4:
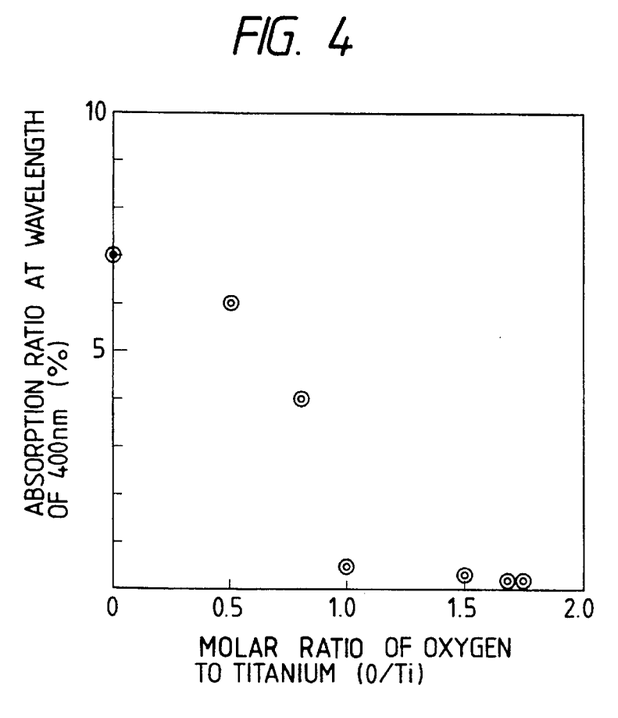
FIG. 4 is a chart showing the absorbance of the optical thin film prepared with the evaporation material of the present invention.

On the optical thin film prepared with practical film forming rates and having an optical thickness of λ/4 (λ=550 nm), there were conducted measurements of the spectral transmittance T and the spectral reflectance R, and the absorbance was calculated from said T and R, as 100−(T+R)%. The obtained results are shown in FIG. 4, which indicates the absorbance at 400 nm in the ordinate and the oxygen-titanium molar ratio (O/Ti) in the abscissa. The optical thin films of O/Ti molar ratio of 0, 0.5 and 0.8 are not satisfactory in performance because of absorption of several per cent. On the other hand, the films with O/Ti molar ratio of 1.0, 1.5, 1.67 and 1.75 are preferable as the absorption does not exceed 0.5%. These optical thin films shows a refractive index of ca. 2.2 at a wavelength of 500 nm.

EXAMPLE 3

Powdered titanium oxide ($Ti_2O_3$) having an oxygen-titanium molar ratio (O/Ti) of 1.5 and powdered zirconium oxide ($ZrO_2$) were mixed to assume Ti-Zr molar ratios of 0.2, 0.7, 1.0, 2.0, 2.5, 3.0, 4.0 and 4.5, then press formed and sintered for ca. 3 hours at 1450° C. under vacuum to obtain 6 tablets of a diameter of 18 mmφ and a thickness of 12 mm.

Figure 5:
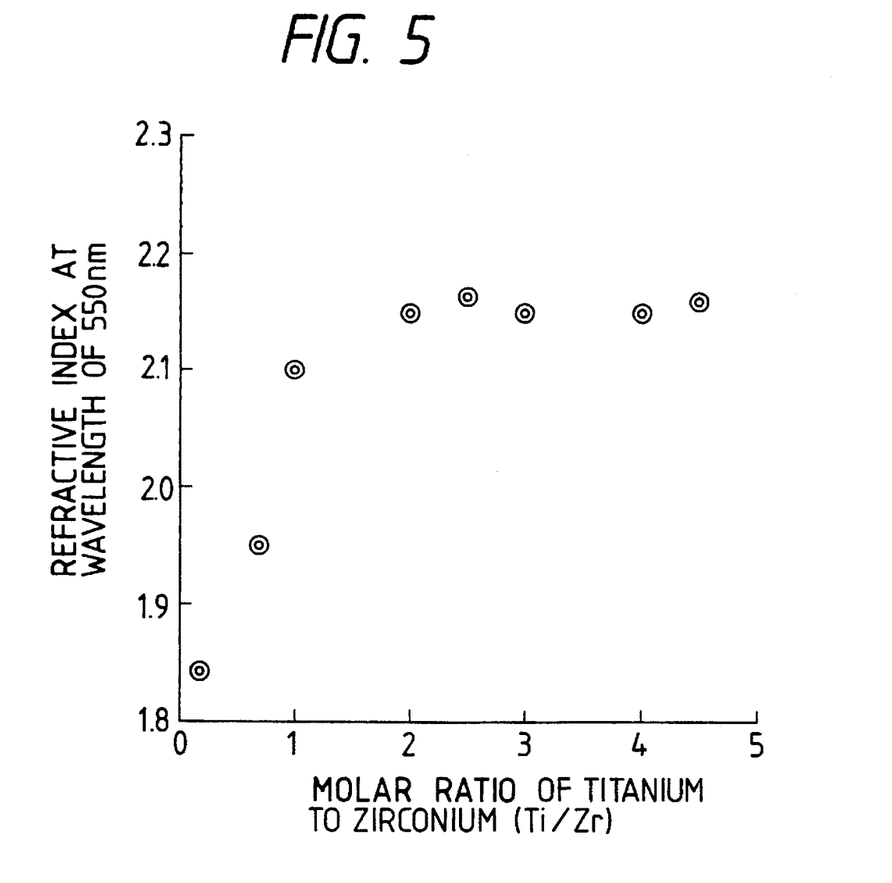
FIG. 5 is a chart showing the refractive index of the optical thin film prepared with the evaporation material of the present invention.
Figure 6:
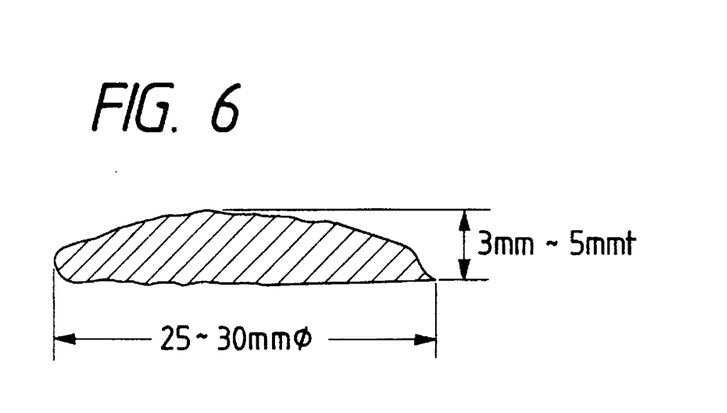
FIG. 6 is a schematic cross-sectional view of an evaporation pellet of a material not belonging to the present invention, after the evaporating operation.

Then optical thin films were prepared in a similar manner as in the example 1, and the refractive index at 500 nm was obtained from the spectral characteristics of the obtained optical thin films. FIG. 5 shows the obtained refractive index in the ordinate as a function of the Ti/Zr molar ratio in the abscissa. As shown in FIG. 5, a high refractive index exceeding 2.1 could be obtained in the optical thin films prepared with the evaporation material with a Ti/Zr molar ratio of 1.0 of higher. However, in case of the molar ratio of 4.5, the tablet after evaporation operation showed a deformation, as shown in FIG. 6, of the diameter from 18 mm to 25–30 mm and the thickness from 12 mm to 3 to 5 mm by fusion, and the scattering of the evaporation material could be observed. Also the optical thin film showed deposition of small particles. On the other hand, the evaporation materials of the molar ratios of 1.0, 2.0, 2.5, 3.0 and 4.0 did not show the deformation of tablet by fusion after the evaporation operation, and did not show the deposition of fine particles on the optical thin films.

Also the stability of fusion by the electron beam irradiation was particularly excellent in the molar ratio in a range of 2.0 to 3.0. A good stability of fusion means that, under the irradiation with the electron beam, the fused area at the surface of the evaporation material does not vary as a function of time but only in the direction of depth, while retaining the fused state at the surface. The cross-sectional shape of the hole formed after the evaporation operation should preferably be as close as to the tubular shape. With reference to FIG. 2, the stability of fusion of the evaporation material becomes better as a ratio $\phi_B/\phi_A$ comes closer to 1, wherein $\phi_A$ is the average diameter of fused hole on the surface of the evaporation material, and $\phi_B$ is the average diameter of the fused hole at a half d/2 of the depth d of the fused hole. The value of the ratio $\phi_B/\phi_A$ was about 0.7 or higher for molar ratios of 2.0 to 3.0, and was about 0.9 at a molar ratio of 2.5.

EXAMPLE 4

In the foregoing examples, the evaporating operation was conducted with the substrate maintained at the room temperature, and the temperature of the substrate reached about 70° C. by the radiation from the evaporation source but never exceeded 80° C. In this example, the optical thin films were prepared in the same manner as in the example 1, except that the substrate was heated to 300° C. The obtained optical thin films showed a refractive index of 2.3 to 2.4 at a wavelength of 550 nm. In this manner the heating of the substrate is effective in obtaining the optical thin film of a high refractive index, if the substrate is insensitive to heating. Also in this example, stable evaporation was possible, with scarce outgassing from the evaporated materials by the electron beam heating. As explained above, the evaporation material of the present invention enables stable evaporation even when the substrate is heated to a higher temperature, in the order of 300° C.

EXAMPLE 5

Figure 7A:
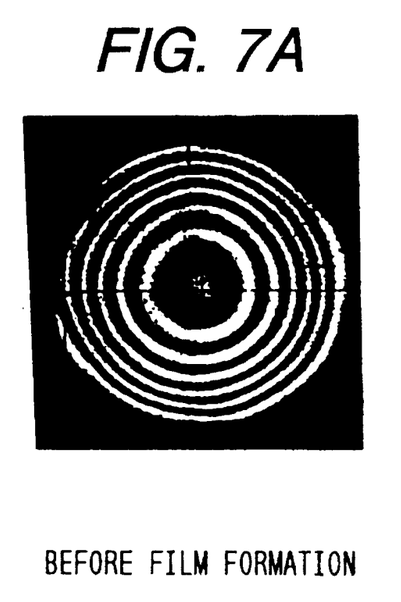
FIGS. 7A and 7B are views showing the facial precision of a plastic lens when an optical thin film is formed thereon according to the present invention.
Figure 7B:
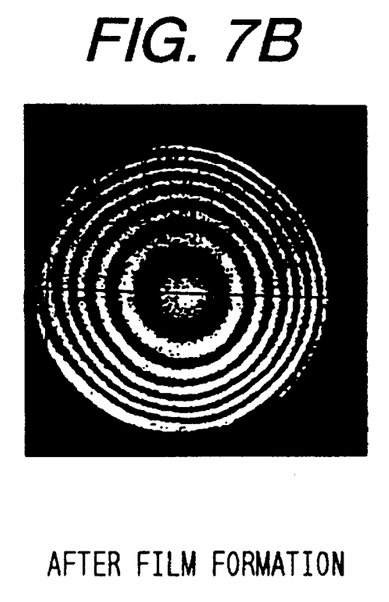

Lenses of 18 mmφ were prepared by injection molding of polymethyl methacrylate (PMMA), polycarbonate (PC) or polystyrene (PS). Also a replica lens was formed by forming ultraviolet-curving acrylic resin with a thickness of ca. 20 μm on a glass plate, utilizing a quartz mold. The above-mentioned optical elements of four different resins were placed as the substrates in an evaporation apparatus, and optical thin films were deposited thereon by the method shown in the example 1. The variation in the facial precision before and after the evaporating operation was measured by an interferometer, and FIG. 7 shows the results of said measurement in case of the PMMA molded lens. There was not observed any change in the facial precision before and after the evaporation, and similar results could be obtained also for other lenses.

EXAMPLE 6

In the foregoing examples, the amount of oxygen introduction during the evaporation was fixed at $1\times10^{-4}$ Torr. In this example, the amount of oxygen introduction was varied in five levels of $3\times10^{-5}$, $5\times10^{-5}$, $1.5\times10^{-4}$, $2.0\times10^{-4}$ and $2.5\times10^{-4}$ Torr, but other conditions and materials for the preparation of the optical thin films were made same as those in the example 1. As a result, the optical thin film prepared with the oxygen pressure of $3\times10^{-5}$ Torr showed an absorption of 3 to 5% at a wavelength of 400 nm, presumably ascribable to deficient oxidation. The optical thin films prepared with other oxygen pressures showed absorption not exceeding 0.5%.

Also the optical thin film prepared with the oxygen pressure of $2.5\times10^{-4}$ Torr showed a lower refractive index of 1.95–2.0 at a wavelength of 550 nm, while the optical then films prepared with other oxygen pressures provided refractive index not lower than 2.0.

Figure 8:
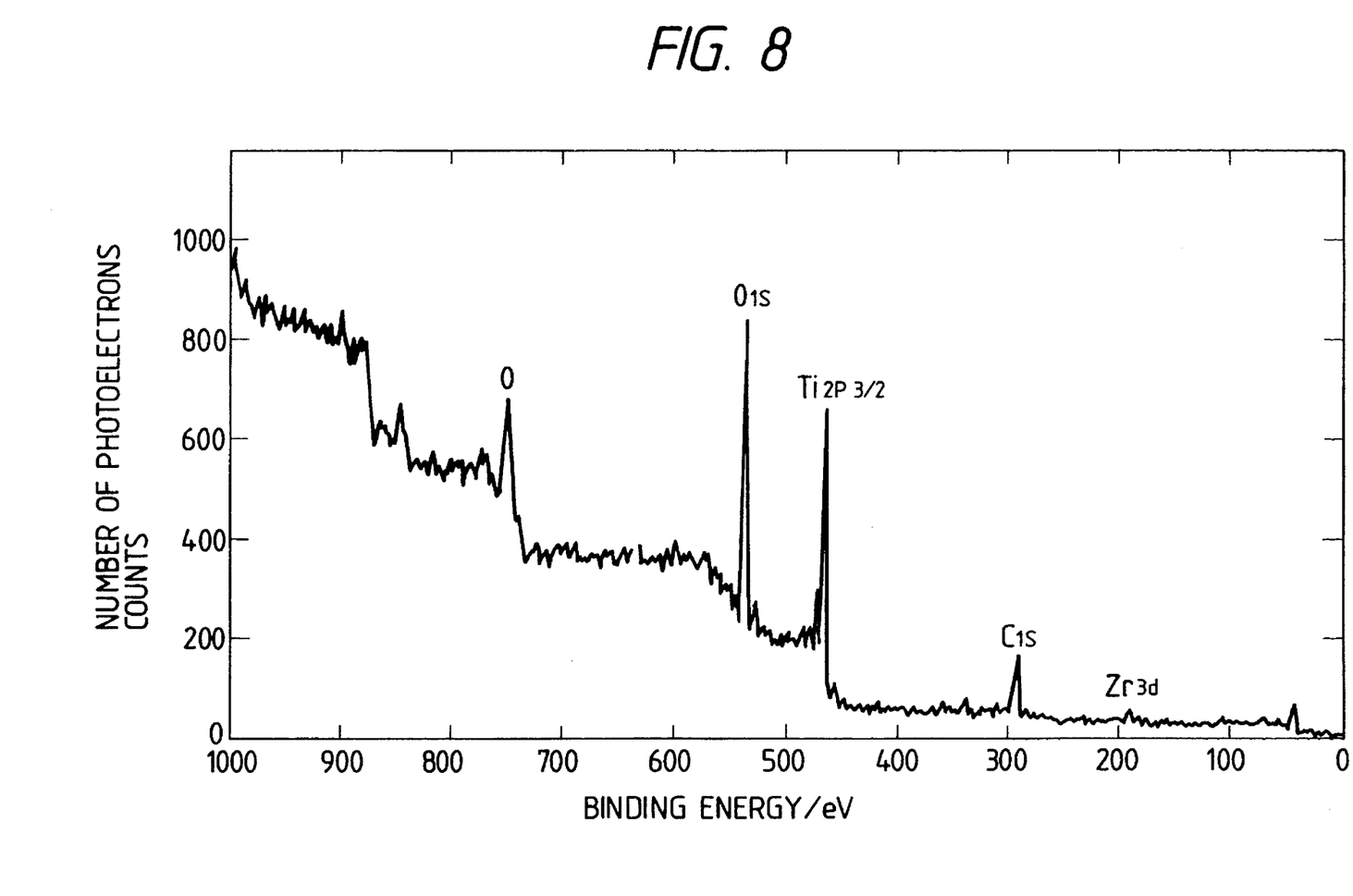
FIG. 8 is a chart showing the result of ESCA analysis in an optical thin film formed with the evaporation material of the present invention.

With respect to the optical thin film prepared in the method of the example 1, the result of ESCA analysis with Mg-kα X-ray source is shown in FIG. 8, which shows the number of photoelectrons in the ordinate and the binding energy (eV) in the abscissa. As shown in FIG. 8, the ratio (Zr/Ti) of 3d peak of zirconium to 2p peak of titanium is 0.06, indicating the high Ti content in the optical thin film. Also the refractive indexes at a wavelength of 550 nm and the above-mentioned peak value ratios, at Ti/Zr molar ratios (Ti/Zr) of 0.2, 0.7, 1.0, 2.5 and 4.0 are shown in the following, wherein the oxygen-titanium molar ratio in titanium oxide is 1.5 as in the example 1:

TABLE 2

| Molar ratio (Ti/Zr) | 0.2 | 0.7 | 1.0 | 2.5 | 4.0 |
| --- | --- | --- | --- | --- | --- |
| Refractive index at 550 nm | 1.84 | 1.95 | 2.08 | 2.10 | 2.15 |
| Peak ratio (Zr/Ti) | 4.9 | 2.9 | 0.1 | 0.06 | 0.02 |

Also the optical thin films prepared with other evaporation materials of the present invention showed the ratio of Zr 3d peak to Ti 2p peak, in the ESCA analysis, of 0.1 or lower, indicating the high Ti content.

Figure 9:
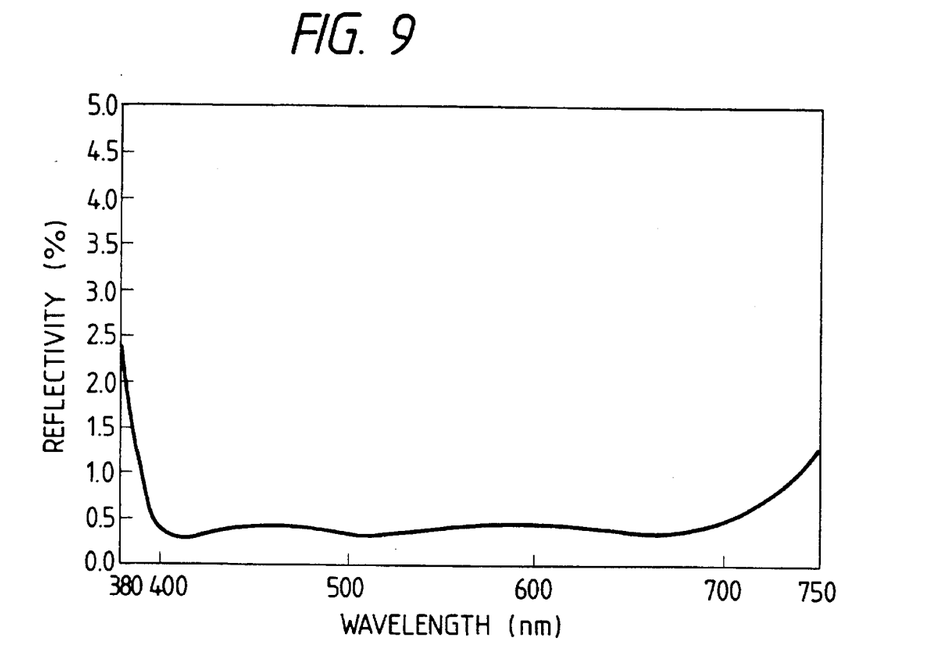
FIG. 9 is a chart showing the spectral characteristics of an embodiment of the multi-layered antireflection film including an optical thin film prepared with the evaporation material of the present invention.

In the following there will be explained a multi-layered antireflection film, utilizing the optical thin film of the evaporation material of the present invention. A lens molded with PMMA of a refractive index of 1.49 was employed as the substrate, and an optical thin film of nd=30 nm was formed thereon as a high refractive index layer, with the evaporation material and the film forming method explained in the example 1. Then, as a low refractive index layer, an $SiO_2$ layer was formed with nd=50 nm by electron beam heating, with oxygen introduced at a rate of $1\times10^{-4}$ Torr and with a film forming rate of ca. 10 Å/sec. Subsequently a high refractive index layer was formed with nd=267 nm employing the evaporation material and the film forming method as explained in the example 1, and a low refractive index $SiO_2$ layer was formed with nd=125 nm by electron beam heating, with oxygen introduction of $1\times10^{-4}$ Torr and a film forming rate of ca. 10 Å/sec. The spectral reflectance of the multi-layered antireflection film is shown in FIG. 9, which indicates the reflectivity in the ordinate, as a function of the wavelength in the abscissa. As shown in FIG. 9, an antireflection film with a reflectivity of 0.5% or lower over a wide wavelength range of 400 to 700 nm, could be covered on the above-mentioned plastic lens.

Also an antireflection film was formed with the same evaporation material and the same film forming method as explained in the foregoing, but with the following optical thickness in the respective layers:
Substrate: PMMA molded lens
1st layer: titanium oxide+zirconium oxide; nd=29 nm
2nd layer: $SiO_2$; nd=27 nm
3rd layer: titanium oxide+zirconium oxide; nd=206 nm
4 th layer: $SiO_2$; nd=114 nm.

Figure 10:
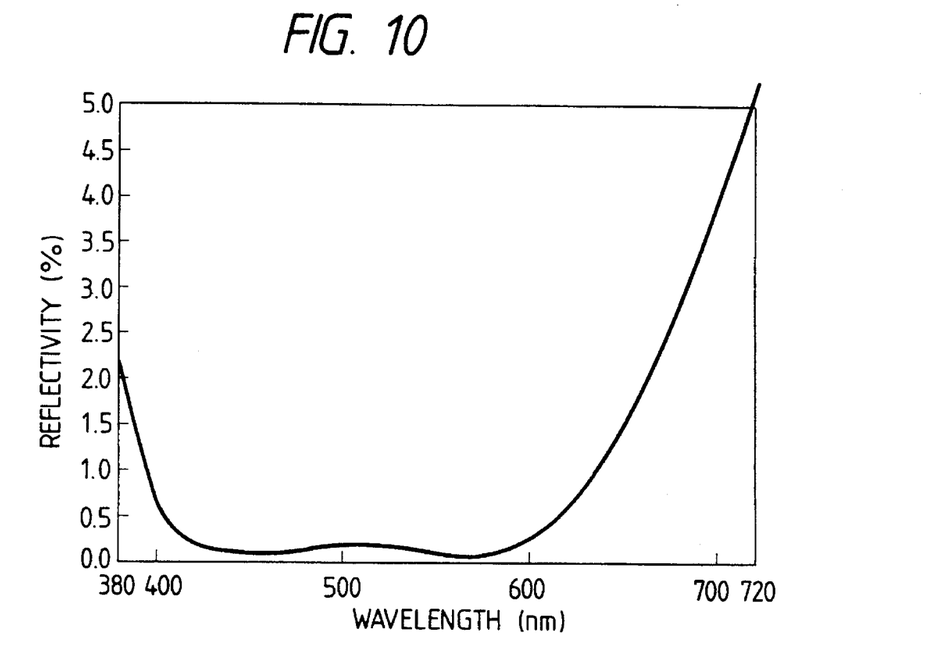
FIG. 10 is a chart showing the spectral characteristics of another embodiment of the multi-layered antireflection film including an optical thin film prepared with the evaporation material of the present invention.

The spectral characteristics of this antireflection film is shown in FIG. 10. It has a U-shaped antireflection range of low reflectance, though narrower than that shown in FIG. 9.

These antireflection films showed satisfactory reliability such as adhesion and abrasion resistance.

As explained in the foregoing, the evaporation material obtained by mixing titanium oxide having oxygen-titanium molar ratio (O/Ti) of 1.0 to 1.75 and zirconium oxide can provide, within a Ti/Zr molar ratio of 1.0 to 4.0, a satisfactory optical thin film, without the scattering phenomenon. Also the evaporation material of the present invention can provide an optical thin film of a high refractive index even when the substrate to be subjected to evaporating operation is set at a low temperature (room temperature to 120° C.), so that it is particularly suitable for use in an optical element including resinous material, such as a plastic lens. It furthermore provides an even higher refractive index when the substrate is heated to the order of 300° C.

What is claimed is:

1. An evaporation material for forming a thin film comprising:
    titanium oxide ($TiO_A$) having a molar ratio A(O/Ti) of oxygen (O) to titanium (Ti) in a range of 1.0 to 1.75 and zirconium oxide ($ZrO_2$), which are mixed with a molar ratio B Ti/Zr of titanium (Ti) to zirconium (Zr) in a range of 1.0 to 4.0, and the resulting mixture is sintered or fused and solidified, forming a material to be evaporated on a substrate to thereby form said thin film.
2. An evaporation material according to claim 1, wherein said substrate is a resin substrate.
3. An evaporation material according to claim 1, wherein said molar ratio B (Ti/Zr) falls within a range of 2.0 to 3.0.
4. An evaporation material according to claim 1, wherein said evaporation material is evaporated at a temperature ranging from room temperature to 120° C.

5. An evaporation material according to claim 1, wherein said evaporated material formed on the substrate is an optical film.

6. An evaporation material according to claim 5, wherein said optical thin film formed on the substrate is an antireflection film.

7. An evaporation material according to claim 5, wherein said optical thin film has a refractive index of 2.0 or higher in a visible spectral region in the range of 400 nm to 700 nm.

* * * * *

UNITED STATES PATENT AND TRADEMARK OFFICE
CERTIFICATE OF CORRECTION

PATENT NO. : 5,578,536

DATED : November 26, 1996

INVENTOR(S) : MAKOTO KAMEYAMA, ET AL.

It is certified that error appears in the above-identified patent and that said Letters Patent is hereby corrected as shown below:

COLUMN 1

Line 25, "( $ZrO_2$ )" should read --($ZrO_2$)-- and "($TiO_2$ )" should read --($TiO_2$)--.

COLUMN 3

Line 36, "However" should read --However,--.

COLUMN 5

Line 19, "1,80," should read --1.80,--.
Line 35, "following" should read --the following--.

COLUMN 6

Line 4, "shows" should read --show--.
Line 23, "of" (second occurrence) should read --or--.
Line 45, "fused" should read --the fused--.

COLUMN 7

Line 10, "ultraviolet-curving" should read --ultraviolet-curing--.
Line 40, "then" should read --thin--.
Line 42, "index" should read --indexes--.
Line 46, "Mg-k$\alpha$" should read --Mg-K$\alpha$--.

UNITED STATES PATENT AND TRADEMARK OFFICE
CERTIFICATE OF CORRECTION

PATENT NO. : 5,578,536

DATED : November 26, 1996

INVENTOR(S) : MAKOTO KAMEYAMA, ET AL.

It is certified that error appears in the above-identified patent and that said Letters Patent is hereby corrected as shown below:

COLUMN 8

Line 57, "ratio B Ti/Zr" should read --ratio B (Ti/Zr)--.

Signed and Sealed this

Thirteenth Day of May, 1997

Attest:

BRUCE LEHMAN

Attesting Officer

Commissioner of Patents and Trademarks